Patented July 19, 1938

2,124,260

UNITED STATES PATENT OFFICE 2,124,260

GAS PURIFYING MATERIAL

Ferdinand Christoph Post, Paris, France, assignor to Compagnie des Produits Chimiques et Charbous Actifs Edouard Urbain, Paris, France, a French company No Drawing. Application January 30, 1937, Serial No. 123,279. In Germany January 30, 1936

1 Claim. (Cl. 252—2.5)

The invention relates to gas-purifying masses preferably used for separating the sulphur from sulphur-containing gases and comprising iron oxides deposited on incombustible carrier materials of large surface area.

The invention consists essentially in utilizing as carrier materials, materials of a good porous nature, that is, gas-permeable materials having a spongy structure, and great mechanical strength. Materials having these properties are, for instance, foam lava (Schaumlava) and correspondingly gas-permeable hard gas cements.

"Foam lava" may be defined as geological surface foam of basaltic nature. Of course, both lava and foam lava are of volcanic origin but foam lava has a highly porous structure, possesses a compressive strength of up to 400 kilos or more per square centimeter, is geologically classified amongst the basic minerals, and chemically consists of silicic acid, aluminum oxide, iron oxide, calcareous earth, magnesia, manganic oxide and alkalies.

The carriers contemplated by the invention have the essential property (while having sufficient mechanical strength) of ability to store sufficient quantities of iron oxide at their external and internal surfaces, which remain practically entirely accessible to gas, while presenting the lowest possible resistance to the flow of the gas to be purified. These conditions are fulfilled when the carrier materials are of a good porous nature, which means that they should not exhibit, for instance, only a capillary structure, like pumice stone or meerschaum, for instance. In the case of the latter materials, there is no possibility of depositing in the capillary cavities large quantities of iron oxides necessary for practical operation, so that notwithstanding the absolutely large surface development, only a small utilizable surface is available for depositing the iron oxide.

In contradistinction to this, the carriers now contemplated must have pores, that is, cavities visible to the naked eye, and the whole structure must exhibit a structure like that of sponge rubber. Only then is it possible for also the internal surfaces of the carrier to be coated with sufficiently strong layers of iron oxides and for these layers to be practically completely accessible to gas. It is just the storage of large quantities of iron oxide which is one of the conditions for the economical utilization of such gas-purifying materials in the art. It is well-known that the separation of sulphur from gases with iron oxide does not involve a catalytic process, that is an operation in which a reaction accelerator, without itself stoichiometrically participating in the reaction, causes the conversion of any desired quantities of the materials reacting in each case; on the contrary, the iron itself enters into the reaction, as is well-known, and this reaction is terminated as soon as the iron is consumed.

The materials to be employed as carriers, however, must be of such hardness, that is, must have such mechanical strength, that they can be employed in thick layers and repeatedly, without disintegrating to fine dust in storage owing to their internal brittleness.

The materials to be employed according to the invention fundamentally differ in this respect from known carrier materials. The products obtained, for instance, by introducing blast furnace slag into water, as is known from experience, are so brittle and so little resistant to pressure, that they disintegrate to sand under the slighest jolt or blow. Such a body is not resistant to manipulation; its brittleness and low mechanical strength prohibit its use for the purpose according to the invention. It will not withstand the unavoidable vibrations, jolts and blows met in transport, loading and unloading, filling into the gas-purifying boxes, etc.

The new gas-purifying mass, on the contrary, permits of repeated use and does not break up during the filling into the gas-purifying boxes and during the stirring or shovelling necessary when in actual use. It remains unaffected, so that owing to this strength, the resistance which it offers to passage of gas through it always remains the same. It may also be regenerated as often as desired, that is, it may be freshly charged with iron oxides without the carrier body undergoing any change. The great hardness allows of regaining the carrier material and using it again after the exhausted reaction mass has been removed. This property also facilitates the recovery of the absorbed sulphur, for the mass can be subjected to any treatment of a mechanical, physical or chemical nature, without the sulphur mixing therewith as a result of the disintegration of the carrier material.

The advantages of the new carrier materials over those with even a strongly pronounced capillary structure are best illustrated by results obtained from practical operation, on the one hand, with foam lava and, on the other, with pumice stone. Desulphurization of town gas carried out under comparative conditions showed that with 1 kg. of the new gas-purifying material, 50–60 cubic metres of town gas can be desulphurized, while pumice stone charged with iron oxide could only desulphurize 10-15 cubic metres to the same degree of purification. Meerschaum as carrier yielded even smaller quantities of gas.

If this comparison shows the great improvements in the desulphurization output, the following figures give an illustration of the good gas-permeability of the new mass in comparison with the gas-purifying masses in dust form which are commonly employed in the art at the present day. A battery of gas-purifying boxes each having two layers of gas-purifying material in dust form, each 40 centimetres in height, causes a pressure loss of, on the average, 150 mms. water column, which have to be overcome by a blower, with a corresponding power consumption. With the same total layer of 4×2×40 cms.=320 m., the new purifying material causes a pressure loss of only 8 to 10 mms.

It is also to be emphasized that in comparison with the purifying materials customarily employed at the present day which have loosening materials, such as sawdust and the like, the new material has the great advantages of not igniting even during regeneration, whereas with the previously-used materials the fires of self-ignitions which are so dangerous in gas operation are always to be reckoned with during regeneration, as is well-known.

To summarize, therefore, the following advantages appertain to gas purification with the new purifying material:—

1. Great hardness, which allows of using thick layers.
2. Low resistance to the passage of gas, which also allows the use of thick layers.
3. Accessibility of the whole of the effective reaction material for gas and, consequently, complete utilization of the material.
4. Reaction at the surface of the structure and no destruction of the material by disintegration.
5. Facilitation of manipulation, regeneration in situ and consequent saving of cost.
6. Possibility of fresh use of the structure after removal of the exhausted reaction material.
7. Avoidance of any danger of fire.
8. Improvement in the recovery of sulphur from the gas reaction material.

The new gas-purifying material not only offers great advantages to the industries which are already using the usual materials for the desulphurization and purification of their gases, as, for instance, the town gas industry, but also enables the economical desulphurization and purification of gases in all other cases where this problem exists, for instance, in coke plants, where the use of the usual materials is too expensive owing to the large quantities of the gases to be treated and the fact that the small margin of profit prohibits this. This applies furthermore, inter alia, to the treatment of natural gases or highly rarefied waste gases in petroleum refining.

I claim:—

A gas purifying material for separating sulphur from sulphur containing gases comprising lava foam characterized as a highly porous incombustible carrier substance in which the pores are intercommunicating to permit passage of the gas to be purified, and having iron oxide deposited on the walls of said pores without materially affecting the substance as to its permeability to gas, said purifying material having great strength to permit handling without crumbling or pulverization, and said material being substantially unaffected by high temperatures or contact with acids.

FERDINAND CHRISTOPH POST.